Feb. 27, 1940.     C. A. BROTHERTON     2,191,876
BEARING LUBRICATION
Filed March 27, 1939
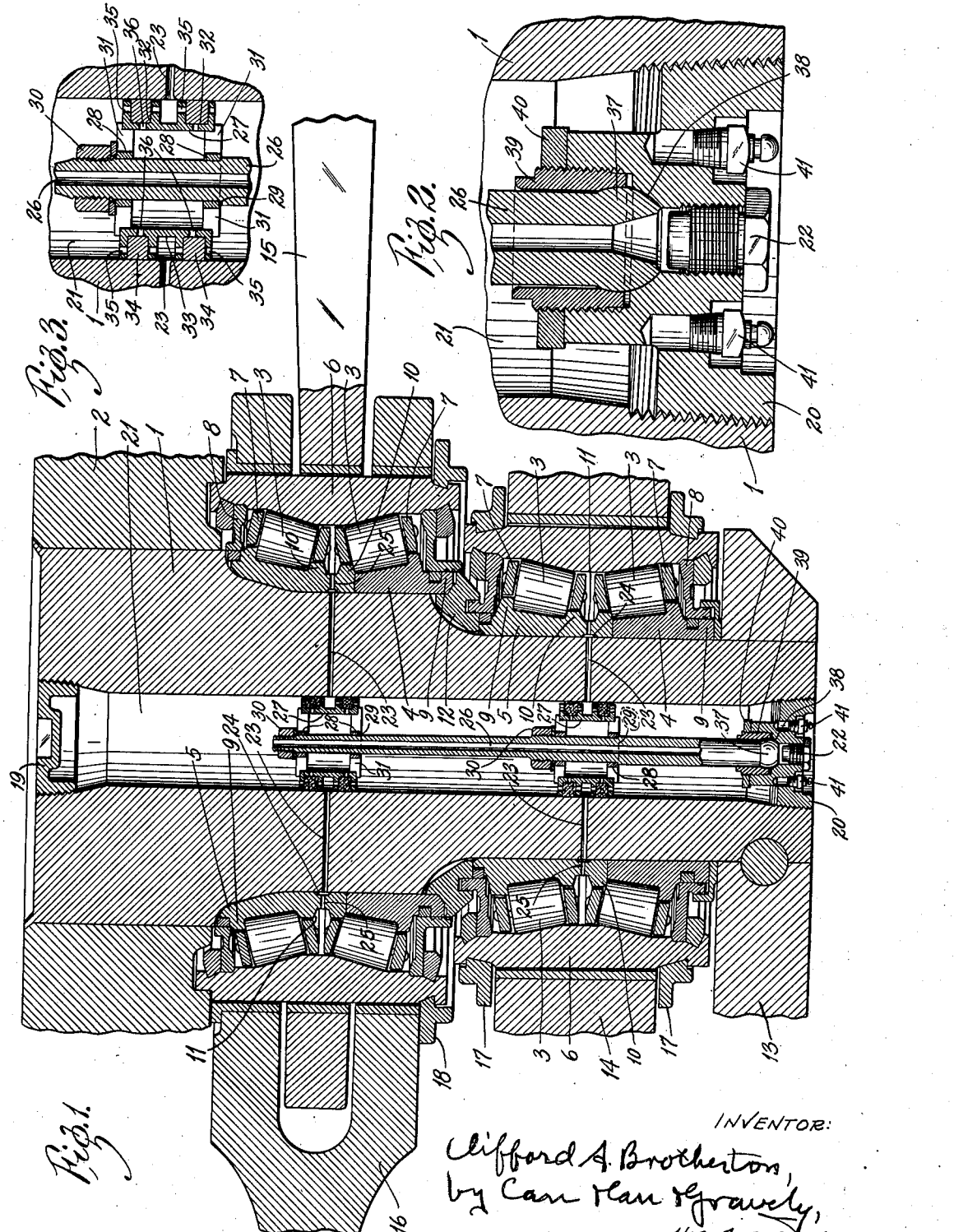

Patented Feb. 27, 1940

2,191,876

UNITED STATES PATENT OFFICE 2,191,876

BEARING LUBRICATION

Clifford A. Brotherton, Columbus, Ohio, assignor to The Timken Roller Bearing Company, Canton, Ohio, a corporation of Ohio Application March 27, 1939, Serial No. 264,279

7 Claims. (Cl. 308—187)

This invention relates to the lubrication of bearings, particularly lubricating locomotive rod bearings of the kind shown in Buckwalter Patent No. 2,040,803 wherein the bearings are supplied with lubricant from an axial reservoir in the locomotive crank pin and the flow of the lubricant to said bearings is retarded by a device that fits within said reservoir and is rigid with a removable closure therefor. Said Buckwalter construction is a highly meritorious device and the object of the present invention is to make further improvements thereon, to-wit: to provide for the escape of air from the reservoir and thus prevent the formation therein of air pockets which interfere with the filling thereof and the proper lubrication of the bearings, to modify the inner raceway members of the bearings so as to facilitate and equalize the distribution of the lubricant, and to obtain other advantages hereinafter appearing. The invention consists in the lubricating bearing construction and in the combinations and arrangements of parts hereinafter described and claimed.

The accompanying drawing, wherein like symbols indicate like parts wherever they occur, Fig. 1 is a central horizontal section through a lubricating locomotive rod bearing construction embodying my invention; and Figs. 2 and 3 are enlarged sectional views similar to Fig. 1, of the outer end portion of the hollow crank pin and one of the lubricant retarding devices, respectively.

In the accompanying drawing, my invention is illustrated in connection with a locomotive drive rod bearing construction comprising a main crank pin or shaft 1 rigid with the main driving wheel 2 and suitable bearings, preferably two antifriction bearings of the double, taper roller type, located one on the inner end portion of said crank pin and the other on the reduced outer end portion thereof. The two double roller bearings are substantially the same except for differences in size and proportion. Each of said bearings comprises two series of conical rollers 3 interposed between separate cones or inner bearing members 4 and 5 mounted on the crank pin 1 and a common doubly coned cup or outer bearing member 6, suitable retaining cages 7 for the two series of rollers, and suitable closures 8 at the ends of the bearing for the annular space between said cup and cones for preventing the escape of lubricant. The bearing cones 4 and 5 are provided at their remote ends of their raceways with thrust ribs 9; and ribs 10 are also provided at the adjacent ends of said raceways, these ribs being both formed integral with the innermost bearing cone 5 and separated by peripheral annular grooves 11 formed therein. A spacer sleeve 12 is mounted on the crank pin between the adjacent ends of the cones 4 and 5 of the two double bearings; and the eccentric crank 13 of the locomotive valve gear (not shown) is pinned to the outer end of said crank pin and serves to retain the two bearings thereon.

Journaled on the cup of the outermost double bearing is the adjacent end of the connecting or main rod 14 of the locomotive; and journaled on the cup of the innermost double bearing are the adjacent ends of the front and rear coupling or side rods 15 and 16, respectively. The main rod 14 is held on the outermost bearing by means of suitable split retaining rings 17 that seat within peripheral grooves provided therefor in the cup of said bearing on opposite sides of said main rod; and front and rear side rods 16 and 17 are held on the cup of the innermost bearing between the hub portion of the driving wheel 2 and a split retaining ring 18 that seats in a peripheral groove formed in said cup and is disposed in abutting relation to the outer side face of the rear side rod.

The crank pin 1 is provided with an axial bore that is closed at its inner and outer ends by threaded closure plugs 19 and 20, respectively, to provide a chamber or reservoir 21 that is supplied with lubricant through a suitable pressure feed fitting or valve 22 threaded into an axial bore provided therefor in the outermost plug 20. The hollow crank pin is provided opposite the external annular groove 11 that separates the two external ribs 10 of the innermost bearing cone 5 of each double bearing with a series of radially extending lubricant passageways 23, whose outer ends communicate with an annular groove 24 in the inner periphery of said cone; and said annular groove communicates with said external annular groove 11 through a series of radial passageways 25 in said cone. With this arrangement, lubricant in the chamber or reservoir 21 of the crank pin flows through the two series of radial passageways 23 in said pin into the internal annular grooves 24 in the cones 5 of the respective bearings, thence through the radial passageways 25 in said cones into the external peripheral grooves 11 thereof and thence into the annular spaces between the cones and cups of said bearings where it is retained by the annular end closures 8 therefor.

Means are provided for retarding the flow of lubricant from the axial reservoir 21 in the crank pin to the respective bearings. Said means preferably comprises a feed tube 26 that extends longitudinally of said reservoir with one end in communication with the inlet fitting 21 through the axial bore of the outermost plug 20 and with the other end opening into said reservoir adjacent to but short of the inner end thereof. Disposed opposite the series of radial passageways 23 leading from the lubricant reservoir 21 to each double bearing is a lubricant retarding device comprising a cylindrical sleeve 27 that surrounds but is spaced from the feed tube 26 and has hub portions 28 that are sleeved on said tube between an annular shoulder 29 thereof and a nut 30 threaded thereon and are connected to said sleeve by spokes 31. Each of the lubricating retarding sleeves 27 is provided on its exterior surface with annular end and intermediate grooves 32 and 33, respectively. The intermediate groove 33 is located opposite to and in communication with the inner ends of the radial passageways 23 leading from the axial reservoir 21 in the crank pin; and the end grooves 32 form annular seats for rings or washers 34 of felt or other porous material that snugly fit said reservoir on opposite sides of said passageways. The side walls of the grooves 32 and 33 are provided with series of circumferentially spaced holes 35 and the bottom of the washer containing groove 34 is provided with a series of radial holes 36 that establish communication between the lubricant reservoir 21 and said grooves.

The lubricant tube 26 has a fluid tight universal joint connection with the outermost plug 20 for the lubricant reservoir 21 comprising a ball 37 on the outer end of said tube and a spherical socket 38 formed in the axial bore of said plug and in a sleeve 39, which is threaded into said bore and has a lock nut 40 thereon. The feed tube supporting plug 20 is also provided with one or more suitable air relief fittings or valves 41 adapted to permit the escape of air from the lubricant reservoir 21.

By the arrangement described, the reservoir in the crank pin is filled with lubricant through the pressure fitting 22 in the closure plug 20 in the outer end of said crank pin, the lubricant being delivered by the feed tube 26 to the inner end of said reservoir, thereby forcing the air therein toward the outer end thereof where it escapes through the air discharge fittings 41. This discharge of the air from the reservoir prevents the formation therein of air pockets which reduce the capacity thereof and interfere with the flow of the lubricant to the bearings. Lubricant supplied from the reservoir to the bearings must first pass through the felt rings 34, thereby causing a relatively slow feed of the lubricant to the bearings and thus preventing excess bearing lubrication, waste of lubricant and less frequent replenishing thereof. The lubricant retarding devices may be quickly and easily removed from and inserted in the lubricant reservoir with the closure plug 24 therefor as a unit; and the ball-and-socket connection between said plug and the feed tube 26 permits said lubricant retarding devices to automatically center themselves in said reservoir and thus insure continuous contact of the felt rings 34 therewith and an equal and uniform flow of the lubricant to the two bearings. One of the two bearing cones of each double bearing spans the space between the two inner raceways thereof and has radial passageways formed therein that open into the interior of said bearing substantially midway of the ends thereof, thereby facilitating and equalizing the distribution of the lubricant between the two series of bearing rollers.

Obviously, the invention is applicable to front, rear and intermediate crank pin bearings and to other lubricating bearing constructions.

What I claim is:

1. A lubricating bearing construction comprising a bearing, a shaft therein having a longitudinal lubricant reservoir, a passageway leading from said reservoir to said bearing, and lubricant inlet and air discharge passageways at one end of said reservoir, and a tube located in said reservoir and communicating at one end with said lubricant inlet passageway and opening into said reservoir only near the end thereof remote from said lubricant inlet and air discharge passageways.

2. A lubricating bearing construction comprising a bearing, a shaft therein having a longitudinal lubricant reservoir and a passageway leading from said reservoir to said bearing, a closure for one end of said reservoir, lubricant inlet and air discharge passageways in said closure, and a tube communicating at one end with said inlet passageway and opening into said reservoir only near the end thereof remote from said closure.

3. A lubricating bearing construction comprising a bearing, a shaft therein having an axial lubricant reservoir and radial passageways leading from said reservoir to said bearing, a closure for one end of said reservoir, lubricant inlet and air discharge fittings in said closure, a tube located in said bore and communicating at one end with said inlet fitting and at its other end with said reservoir only near the end thereof remote from said closure, and a lubricant retarding device mounted in said reservoir between said other end of said tube and said radial passageways.

4. A lubricating bearing construction comprising a bearing, a shaft therein having an axial bore forming a lubricant reservoir and radial passageways leading from said reservoir to said bearing, a removable closure for one end of said reservoir, a lubricant retarding sleeve adapted to snugly fit said bore opposite said passageways, lubricant feed and air discharge fittings in said closure and a feed tube communicating at one end with said feed fitting and constituting a support for said lubricant retarding sleeve and opening into said bore only between said device and the end of said bore remote from said closure.

5. A lubricating locomotive rod bearing construction comprising a double bearing, a crank pin therein having a longitudinal lubricant reservoir and passageways leading from said reservoir to said bearing, a closure for the outer end of said reservoir, lubricant inlet and air discharge fittings in said closure, and a tube communicating at one end with said inlet fitting and opening into said reservoir near the inner end thereof.

6. A lubricating locomotive rod bearing construction comprising two double bearings each having a common outer raceway member and two inner raceway members, a crank pin journaled in said bearings and bearings having an axial lubricant reservoir and radial passageways leading from said reservoir to the respective bearings, a removable closure member for the outer end of said reservoir, lubricant retarding devices adapted to snugly fit said bore opposite said passageways, lubricant inlet and air discharge fittings in said closure, and a tube communicating at one end of said lubricant inlet fitting and opening into said bore between the innermost retarding device and the inner ends of said reservoir.

7. A lubricating locomotive rod bearing construction comprising two double bearings each having a common outer raceway member and two inner raceway members, a crank pin journaled in said bearings and bearings having an axial lubricant reservoir and radial passageways leading from said reservoir to the respective bearings, a removable closure member for the outer end of said reservoir, lubricant retarding devices adapted to snugly fit said bore opposite said passageways, lubricant inlet and air discharge fittings in said closure, and a tube communicating at one end of said lubricant inlet fitting and constituting a support for said lubricant retarding devices and opening into said bore between the innermost retarding device and the inner end of said reservoir, a main rod journaled on the outer raceway member of the outermost double bearing, and front and rear rods journaled on the outer raceway member of the innermost double bearing.

CLIFFORD A. BROTHERTON.